US011620809B2

(12) United States Patent
Huang et al.

(10) Patent No.: US 11,620,809 B2
(45) Date of Patent: Apr. 4, 2023

(54) ROBUST FIDUCIAL MARKER FOR FLEXIBLE SURFACES

(71) Applicant: Dilili Labs, Inc., Santa Clara, CA (US)

(72) Inventors: Jiawei Huang, San Jose, CA (US); Dexin Li, Fremont, CA (US); Xintian Li, Saratoga, CA (US)

(*) Notice: Subject to any disclaimer, the term of this patent is extended or adjusted under 35 U.S.C. 154(b) by 108 days.

(21) Appl. No.: 16/566,892

(22) Filed: Sep. 11, 2019

(65) Prior Publication Data

US 2020/0082200 A1   Mar. 12, 2020

Related U.S. Application Data

(60) Provisional application No. 62/729,427, filed on Sep. 11, 2018.

(51) Int. Cl.
*G06V 10/44* (2022.01)
*G06V 10/56* (2022.01)

(52) U.S. Cl.
CPC ............ *G06V 10/457* (2022.01); *G06V 10/56* (2022.01)

(58) Field of Classification Search
CPC .. G06K 9/4638; G06K 9/4652; G06K 9/3216; G06K 2009/3225; G06T 2207/10024; G06T 2207/30208; G06T 7/74; G06T 7/10
See application file for complete search history.

(56) References Cited

U.S. PATENT DOCUMENTS 9,727,811 B2 * 8/2017 Osborne ................ A61Q 19/00
2017/0193260 A1 * 7/2017 Prusik .................. G06K 7/1473

OTHER PUBLICATIONS

Wang, John, and Edwin Olson. "AprilTag 2: Efficient and robust fiducial detection." 2016 IEEE/RSJ International Conference on Intelligent Robots and Systems (IROS). IEEE, 2016. https://ieeexplore.ieee.org/stamp/stamp.jsp?tp=&arnumber=7759617 (Year: 2016).*
Walters, Austin, and Bhargava Manja. "ChromaTag-A Colored Fiducial Marker." Internet: https://github.com/lettergram/chromatag, May 16 (2015).http://108.61.119.12/wp-content/uploads/2015/05/cs543_Final-chromatags-awalte9-manja2.pdf (Year: 2015).*

* cited by examiner

*Primary Examiner* — Claire X Wang
*Assistant Examiner* — Han Hoang
(74) *Attorney, Agent, or Firm* — Jigang Jin (57) ABSTRACT

The present invention discloses fiducial marker systems or tag systems and methods to detect and decode a tag. In one aspect, a tag comprises four corners. Two upper corners are interconnected to form a detection area. Two lower corners are interconnected to form another detection area. The detection areas are interconnected by a path. The path divides the space between the detection areas into two coding areas. In another aspect, a tag comprises four corners. The four corners are interconnected by multiple paths. The multiple paths divide the space defined by the four corners into multiple coding areas.

15 Claims, 10 Drawing Sheets

ROBUST FIDUCIAL MARKER FOR FLEXIBLE SURFACES

CROSS-REFERENCE TO RELATED APPLICATION

This application claims priority to U.S. provisional patent application Ser. No. 62/729,427, filed Sep. 11, 2018, the entire content of which is incorporated herein by reference.

FIELD OF INVENTION

This invention generally relates to visual fiducial marker technology.

BACKGROUND OF THE INVENTION

A fiducial marker (also known as tag) is an object placed in the field of view of an imaging system which appears in the image produced, for use as a point of reference or a measure. Such tags are artificial landmarks designed to be easy to recognize and distinguish from one another. A fiducial marker system generally includes tags, cameras for capturing images containing these tags, and detection software for detecting and/or identifying these tags.

Fiducial marker systems have been widely used in applications such as augmented reality, Simultaneous Localization and Mapping (SLAM), human robot interaction, package and human detection and tracking, and factory and warehouse management. In these applications, tags are generally designed as two-dimensional ("2D") barcodes. When in use, they are attached to or printed on the surface of an object. Detection software computes the precise three-dimensional ("3D") position, orientation, and identity of the tags relative to the camera.

Prior art fiducial marker systems, such as AprilTag and its predecessors ARToolkit and ARTag, use tags having a square-shaped black border. Tag detection is accomplished by detecting square-shaped black border(s) in an image. Once a tag is detected, its payload within the black border is decoded against a database of known tags. However, such design has many drawbacks. First, tags are often attached to or printed on surfaces that may often be warped, bended, or wrinkled. As such, their square-shaped black borders can be easily distorted and lose the square shape, therefore leading to the failure of their detection. This drawback significantly limits the prior art fiducial systems' applications in rough or difficult environments (e.g., applications where tags worn by a human).

Second, if any portion of the prior art tag's border is blocked or covered (e.g., by a human finger) and the square-shaped black border becomes an open loop, the detection software will fail to detect the tag. Thus, the prior art systems' overall robustness suffers.

The other drawback of the prior art fiducial marker systems is that the square-shaped black border takes up significant amount of tag space, limiting the tags' coding space. As such, it is difficult to reduce the size of the tags if certain amount of coding space is needed.

Thus, a new fiducial marker system is needed to solve the above problems.

SUMMARY OF THE INVENTION

The present invention discloses tags, tag systems, and methods to detect and decode tags. A tag has a square or rectangular shape and is divided into a plurality of cells based on a grid pattern (i.e., arranged in rows and columns). The cells are in uniform shape and size and may be in square or rectangular shape. Each cell is either dark color or light color. Ideally, black color is used as dark color and white color is used as light color to maximize the success rate of tag detection under real-life lighting conditions of tags, which may not produce ideal images of the tags. A cell located along an edge of the tag is called a "border cell"; and a cell not located along any edge of the tag is called an "interior cell."

In one embodiment, each cell in a first full row of cells along a first edge of the tag (e.g., the top edge) being dark color. The first full row of cells includes a first corner cell and a second corner cell of the tag. The first full row of cells defines a first area of the tag. Each cell in a second full row of cells along a second edge of the tag (e.g., the bottom edge) being dark color, and the first edge is opposite to the second edge. The second full row of cells includes a third corner cell and a fourth corner cell of the tag. The second full row of cells defines a second area of the tag. The first area and the second area are interconnected by a path of connected cells in dark color, wherein each cell in the path of connected cells is an interior cell. Two cells are connected if they share a common cell border and are both in dark color. The remaining cells of the plurality of cells (i.e., cells not in the first and second rows and the path) are either dark color or light color. To detect the tag in an image, the present invention detects the four corner cells first in the image. If the four corner cells are detected, the present invention determines whether the first and second corner cells are interconnected in the first area in the image and whether the third and fourth corner cells are interconnected in the second area in the image. If so, the present invention determines whether the first area and the second area are interconnected by a path of connected dark interior cells in the image. If the first area and the second area are interconnected by a path of connected dark interior cells in the image, the tag is detected in the image and the present invention tries to decode the tag in the image.

In one embodiment, the path of connected dark interior cells form a straight line.

In another embodiment, the four corner cells are interconnected by multiple paths of connected dark cells. To detect the tag in an image, the present invention first detects the four corner cells in the image. Next, the present invention determines whether the four corner cells are interconnected by paths containing connected dark cells in the image. If so, the tag is detected in the image and the present invention then tries to decode the tag in the image.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Detailed description of the present invention is provided below along with figures and embodiments, which further clarifies the objectives, technical solutions, and advantages of the present invention. It is noted that schematic embodiments discussed herein are merely for illustrating the invention. The present invention is not limited to the embodiments disclosed.

Figure 1A:
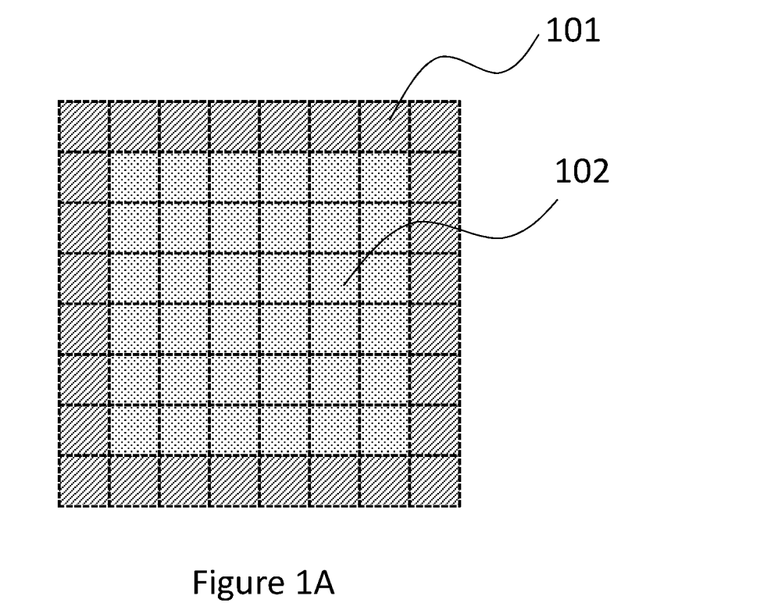
FIG. 1A illustrates a prior art tag design.
Figure 1B:
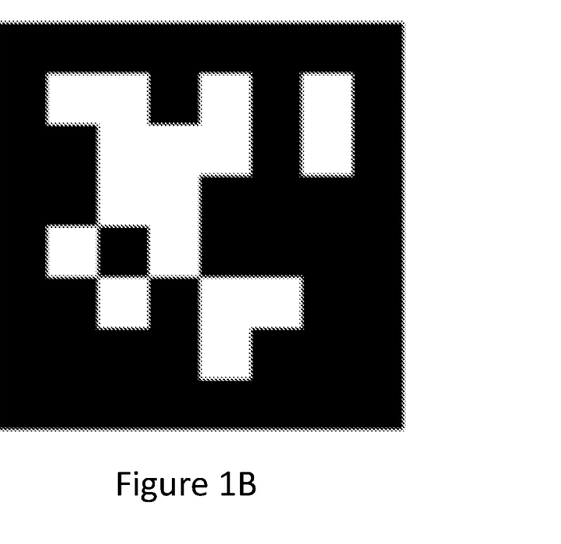
FIG. 1B illustrates an example of a prior art tag.

FIG. 1A illustrates a prior art tag design. As shown, the prior art tag design embodies a square-shaped 8×8 grid, having a total of 64 square units (a.k.a., cells). Each square unit is either in black color or white color. The border section 101 (the hatched section shown in FIG. 1A) is always in black color for tag detection. If the detection software cannot detect the square-shaped black border in an image containing the tag, the tag is not detected. Detection is generally accomplished by computer vision algorithms, such as Union-find for boundary detection and principal component analysis (PCA) for corner detection. The dotted section 102 is used for coding, e.g., by assigning black or white color to each square unit. Thus, although the tag has a total of 64 square units, only 36 square units are actually used for coding, whose maximum coding space is $2^{36}$. The coding area to total tag area ratio is 9:16, which is just slightly above 50%. FIG. 1B illustrates an example of a tag according to this prior art design.

Figure 1C:
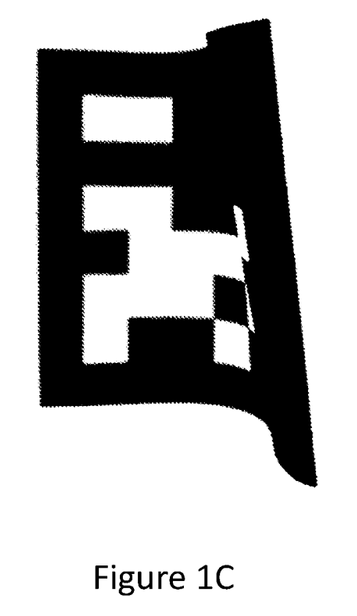
FIG. 1C illustrates a problem with the prior art tag design illustrated in FIG. 1A.

However, the prior art tag design illustrated in FIG. 1A has many drawbacks. FIG. 1C illustrates such a problem where the tag shown in FIG. 1B is warped such that the square-shaped black border captured in an image is not square-shaped anymore. Nor could the detection software reconstruct the square-shaped border by simply adjusting the view point because the tag itself has warped. This could happen when the tag is printed on or attached to a soft or uneven surface which may be warped, stretched, distorted, or wrinkled frequently. For example, in a factory and warehouse management application, some tags are printed or attached on workers' uniforms or clothes. When a worker moves around, the tag on his/her uniform can get easily warped, stretched, or distorted. As a result, the detection software won't be able to detect the tag. If this kind of failure happens too often and widespread, the whole system may stop working properly.

Figure 1D:
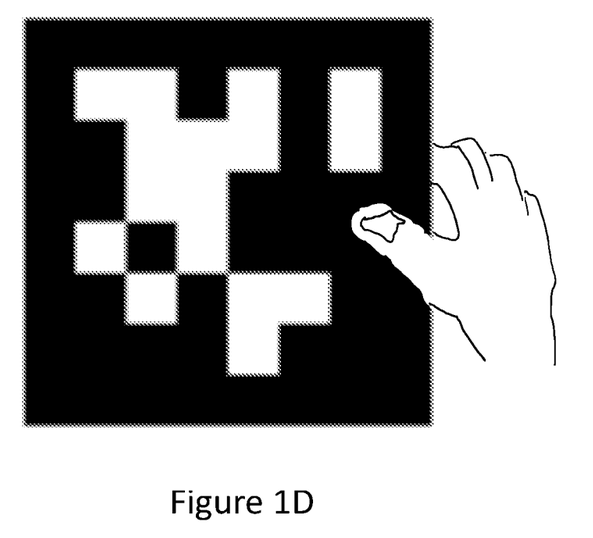
FIG. 1D illustrates another problem with the prior art tag design illustrated in FIG. 1A.

FIG. 1D illustrates another problem with the prior art tag design illustrated in FIG. 1A. As shown, the tag's square-shaped black border is partially covered by a person's thumb. The thumb breaks the closed loop of the border, and if any portion of the square-shaped black border is blocked or covered, the detection software will not be able to detect the tag. Because the border section 101 (shown in FIG. 1A) takes up 7/16 of the total tag area, the probability that the border section of the tag is blocked or covered compared to the probability that the coding section 102 (shown in FIG. 1A) is covered or blocked by an object is 7 to 9. In reality, the ratio should be even higher because when the coding section 102 is blocked or covered by an object (e.g., a hand), the border section is also likely blocked or covered by the same object or any extension of the object (e.g., forearm). As such, the prior art tag design illustrated in FIG. 1A is prone to detection failure.

Figure 2A:
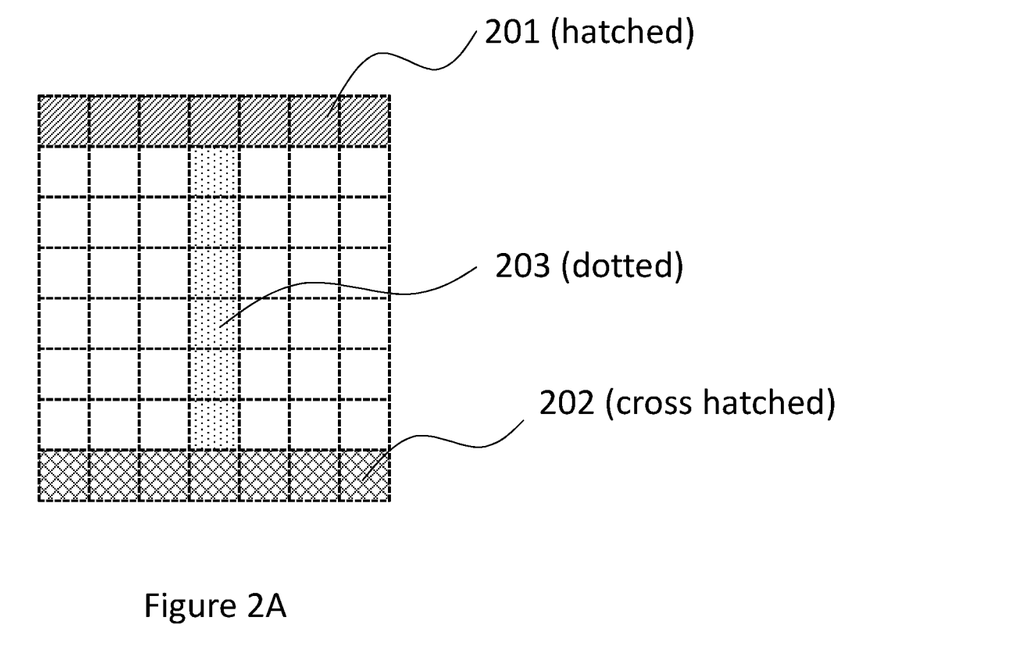
FIG. 2A illustrates a tag design, according to one embodiment of the present invention.

FIG. 2A illustrates a new tag design, according to one embodiment of the present invention. As shown, the new tag design embodies a rectangular-shaped 8×7 grid, including 56 square units or cells. Section 201 (the hatched area) is a full row of square units (including two corner square units) along the top edge of the tag. It contains 7 square units. Section 202 (the crosshatched area) is a full row of square units (including the other two corner square units) along the bottom edge of the tag. Section 202 contains 7 square units. The top edge is opposite to the bottom edge. The middle column, namely section 203 (the dotted area) contains 6 square units. Section 201, section 202 and section 203 (collectively, "the detection area") are always in black color. The detection area is used for tag detection. Specifically, the detection method is to check whether the detection area is interconnected, meaning that it is in continuous black color. This design is more effective and robust in dealing with rough or difficult to control environments. The remaining section contains 36 square units and is used for coding. And each of the remaining 36 square units is either black color or white color. It should be noted that although descriptions of the embodiments in the present application use black and white colors for the square units (or cells), other dark and light colors may also be used as long as they have adequate contrast and can be distinguished in an image by processing software.

The 8×7 grid is used for explaining the embodiment only. Other grid patterns may be used as well. For instance, the shape of a tag may be square or rectangular, and the tags may have various numbers of rows, columns, and square units.

Figure 2B:
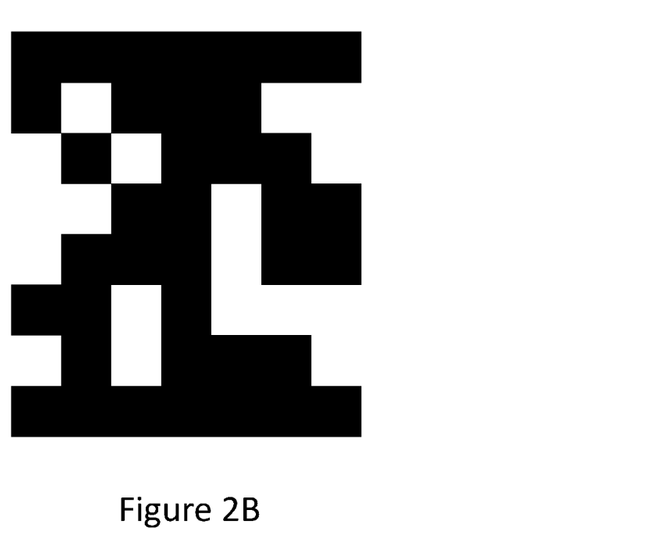
FIG. 2B illustrates an example of a tag, according to one embodiment of the present invention.

FIG. 2B illustrates an example of a tag according to the design illustrated in FIG. 2A. The top and bottom rows are in black color and there is a middle column which is also in black color. Thus, the two top corner cells are interconnected by black cells in the top row. The two bottom corner cells are interconnected by black cells in the bottom row. The top and bottom rows are interconnected by black cells of the middle column. Patterns formed by black and white cells are configured in coding areas. In applications, a tag may be placed with different orientation settings and may also be rotated sometimes. For instance, if the tag shown in FIG. 2B is rotated by ninety degrees anticlockwise, the top and bottom rows become the left and right columns and the middle column becomes a middle row. The orientation change doesn't affect detection of a tag, since the viewpoint may be adjusted by processing software.

Figure 3:
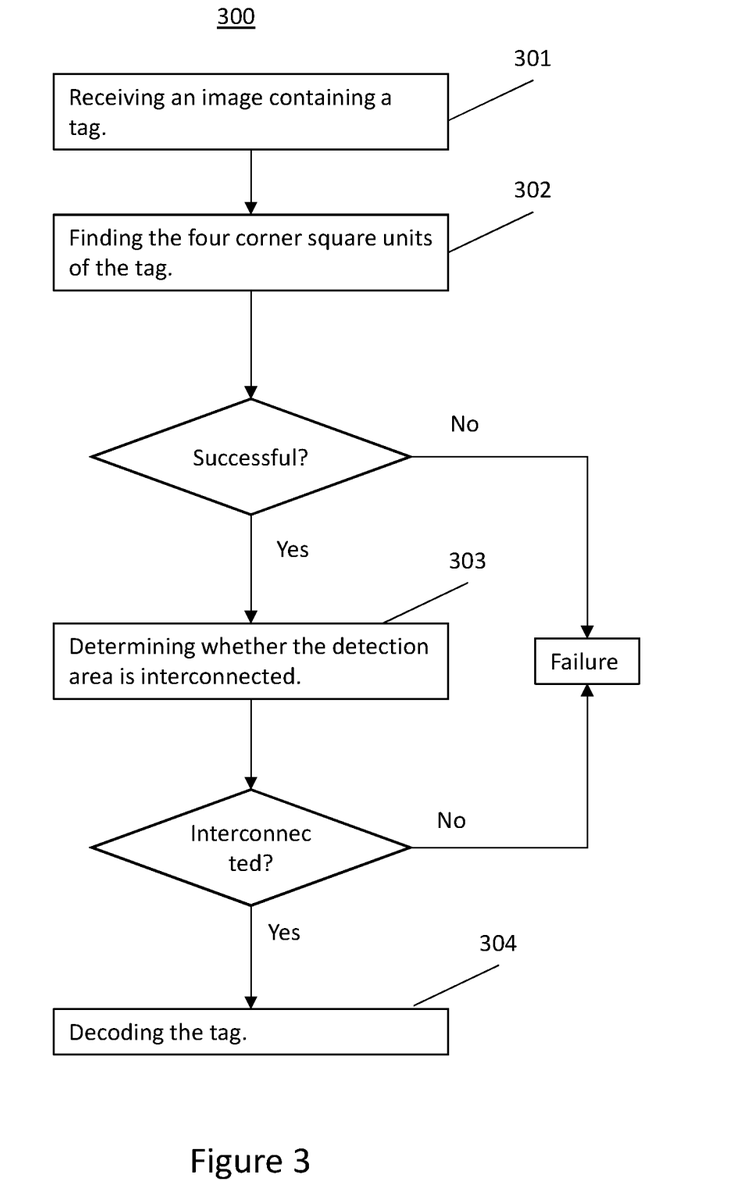
FIG. 3 illustrates a process of detecting a tag, according to one embodiment of the present invention.

FIG. 3 illustrates a process 300 of detecting a tag, such as one following the design illustrated in FIG. 2A. A system for using a tag may include the tag, a working camera, and a processing unit (e.g., a computer) having software or program containing instructions for detecting and decoding the tag. At the beginning, the tag is attached to a target object. At step 301, the process 300 receives an image of the tag captured by the working camera. As shown in FIGS. 1C and 1D, the tag could be warped or occluded.

At step 302, the process 300 scans the image to find the four corners of the tag, which should be in black color. Various computer vision algorithms may be used for finding the four corners. For example, the process 300 may use Harris corner detector to detect the four corners of the tag (e.g., the outermost four corners of all corners detected from the tag image). If the four corners are detected, then the process goes to step 303. Otherwise, tag detection fails and the process reports failure.

At step 303, the process 300 scans the image to determine whether the detection area (as defined in FIG. 2A) is interconnected in black color. Specifically, the process 300 determines whether two of the four tag corners are interconnected along the path of the square units of section 201 of the tag (as shown in FIG. 2A). Here, interconnection does not require that all 7 square units of section 201 be identified, in perfect alignment, or square-shaped in the image. Rather, interconnection is achieved when the square units of section 201 of the tag identified from the image (whether all 7 of them or part of them) together with the two tag corners are interconnected in black color. Similarly, the process 300 determines whether the other two tag corners are interconnected along the path of the square units of section 202 of the detection area (also shown in FIG. 2A) and whether the two sections 201 and 202 are interconnected along the path of the square units of section 203 (also shown in FIG. 2A). If the detection area is not interconnected, then the process reports failure. Otherwise, the tag is detected, and the process goes to step 304, where the tag is decoded.

Figure 4A:
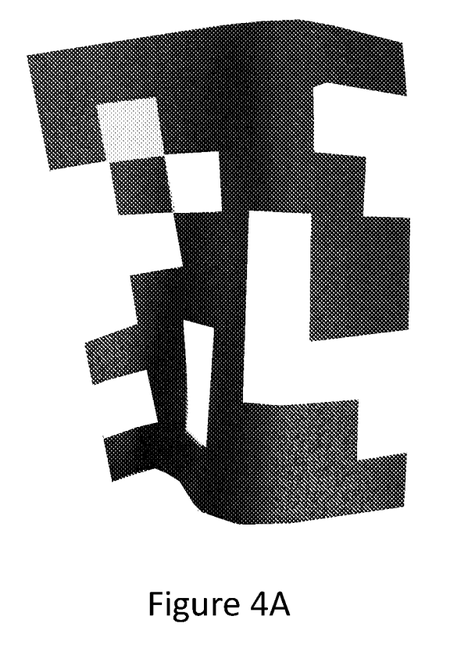
FIG. 4A illustrates how the tag design in FIG. 2A can void the problem illustrated in FIG. 1C.

The new tag design illustrated in FIG. 2A and its detection process illustrated in FIG. 3 have many advantages over the prior art tag design and detection method. For example, FIG. 4A illustrates how the design in FIG. 2A can void the problem illustrated in FIG. 1C. As shown, the tag in FIG. 4A is warped, similar to the example shown in FIG. 1C. However, according to the process illustrated in FIG. 3, the tag's detection area is still interconnected. As such, the tag in FIG. 4A can still be detected, whereas the tag in FIG. 1C could not be detected by the prior art method.

Figure 4B:
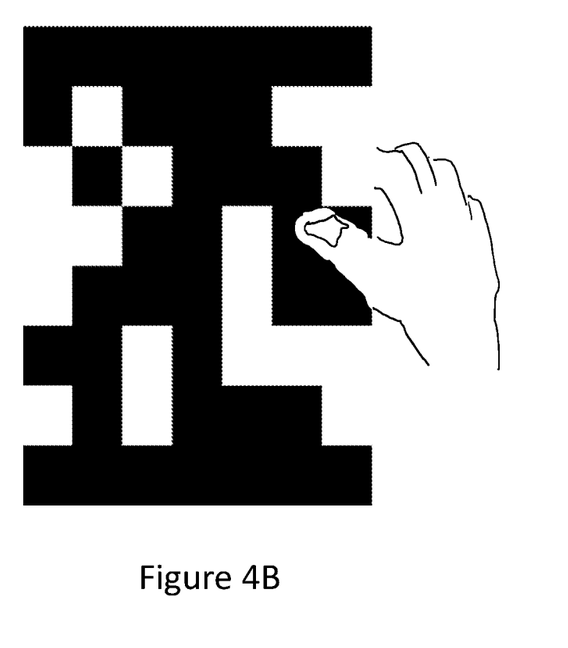
FIG. 4B illustrates how the tag design in FIG. 2A can mitigate the problem illustrated in FIG. 1D.

As another example, FIG. 4B illustrates how the design in FIG. 2A can mitigate the problem illustrated in FIG. 1D. Similar to the example in FIG. 1D, the right edge of the tag in FIG. 4B is covered by a person's thumb. However, this won't affect the detection of the tag in FIG. 4B because the detection area of the tag is still interconnected.

In addition, even though part of the coding area in FIG. 4B is covered, the detection software may still be able to do a partial decoding and narrow down the results to a small range or number of codes. Based on other available information, such as the tag's current location and other tags' historical location data, the system may further narrow down the range or number of codes.

Another advantage of the tag design illustrated in FIG. 2A is that its coding area to total tag area ratio is 9:14, which is better than that of the prior art design. When the coding area is the same, the overall size of the new design is smaller than that of the prior art design.

Figure 5A:
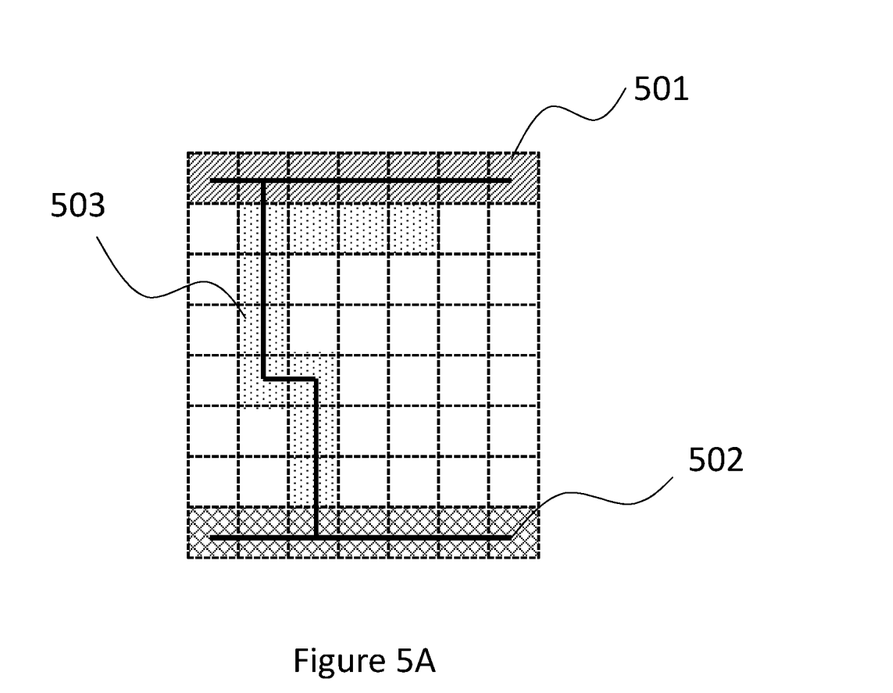
FIG. 5A illustrates a tag design, according to one embodiment of the present invention.
Figure 5B:
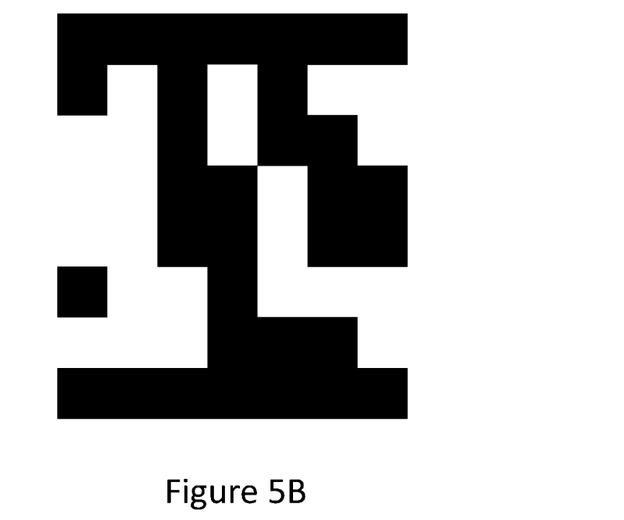
FIG. 5B illustrates an example of a tag, according to one embodiment of the present invention.

FIG. 5A illustrates another tag design, according to one embodiment of the present invention. As shown, the design is similar to the design illustrated in FIG. 2A. The difference is that instead of using the middle column of square units (section 203 in FIG. 2A) as a designated area for detection purposes, the middle column of square units is now used for coding as well. This further improves the coding area to total tag area ratio to 3:4 or 75%. Meanwhile, sections 501 and 502 are still designated for detection purposes. However, the coding area should have at least one path of connected square units interconnecting section 501 and section 502. Here, two square units are connected if the two square units are all in black color and share a common border. The detection method here is to check whether there is at least one path of connected square units interconnecting section 501 and section 502. Compared to the design illustrated in FIG. 2A, the design in FIG. 5A is more flexible and robust. In addition, it has more coding space than the design in FIG. 2A does. FIG. 5B illustrates an example of a tag, according to one embodiment of the present invention.

In one embodiment, a modified version of the process 300 may be used for detecting a tag according to the design illustrated in FIG. 5A. The modified version of the process 300 still scans a tag image to identify the four corners. Then, the modified process determines whether two corners are interconnected along the path of the square units of section 501 and whether the other two corners are interconnected along the path of the square units of section 502. Like the process 300, the modified process determines whether there is at least one path of connected square units (or connected black cells) that interconnects section 501 and section 502. If any of the above steps fails, the detection process reports detection failure and abort the detection process.

Figure 6A:
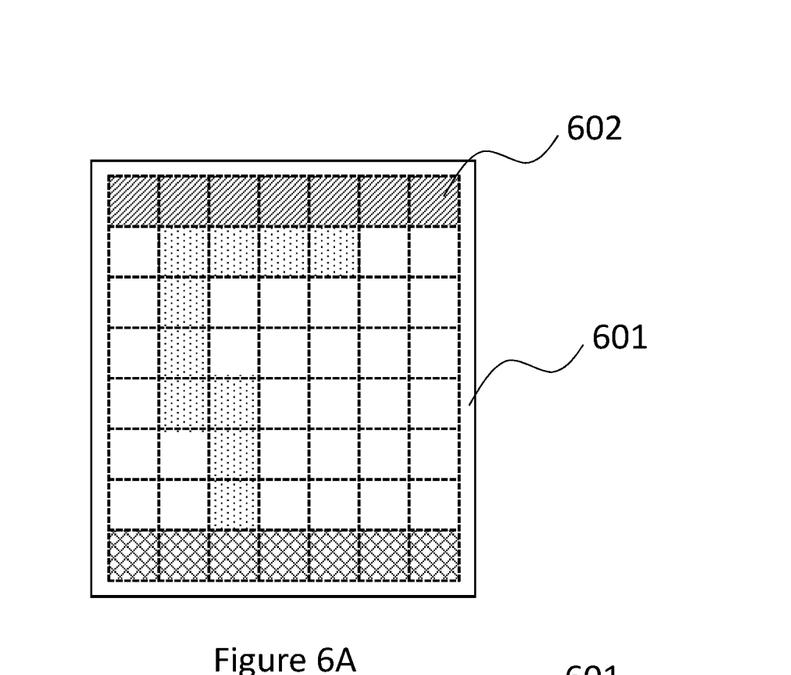
FIG. 6A illustrates a tag design, according to one embodiment of the present invention.
Figure 6B:
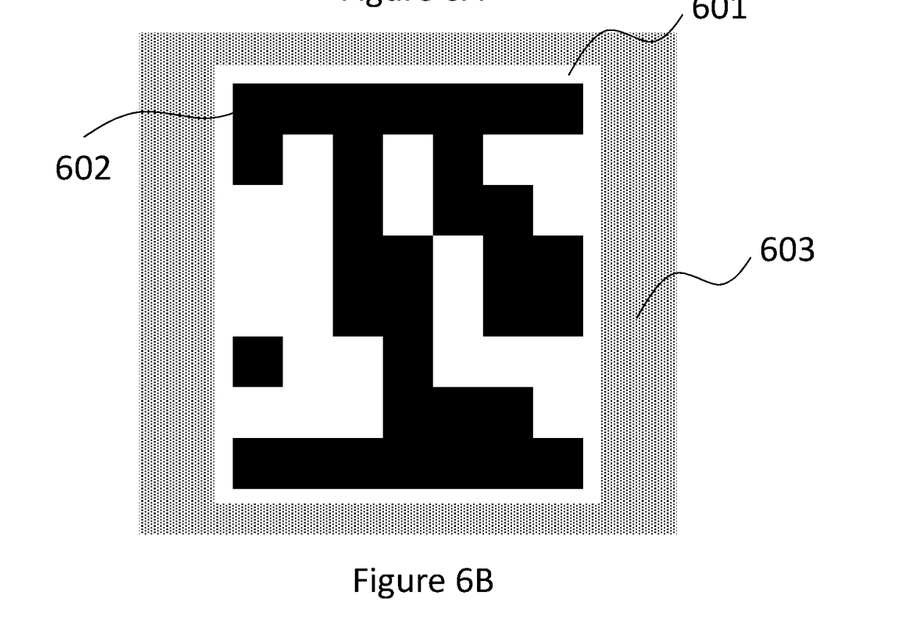
FIG. 6B illustrates an example of a tag, according to one embodiment of the present invention.

In another embodiment of the present invention, as shown in FIG. 6A, a thin white color border 601 is added around the tag. Preferably, the width of the white color border 601 is about ⅓ of the width of the square. This white color border creates a sharp contrast with the designated detection area 602 of the tag and makes it easier for detection. FIG. 6B illustrates an example of a fiducial marker, according to one embodiment of the present invention. As shown, the background 603 may have a color too close to the color of the designated detection area 602. Adding a thin white color border 601 would create a sharp contrast between the designated detection area 602 and the thin white color border 601 so that it is easier to detect the designated detection area 602.

Figure 7:
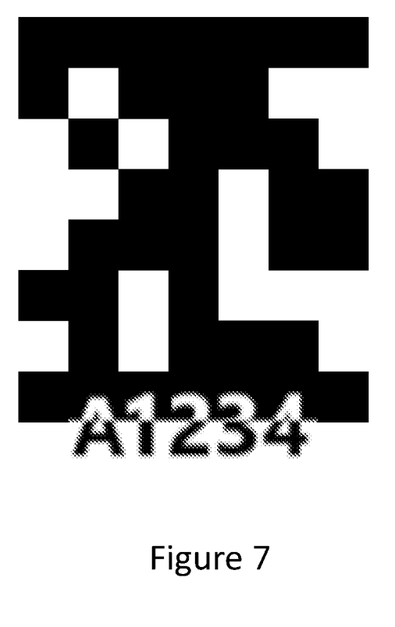
FIG. 7 illustrates a tag design, according to one embodiment of the present invention.

FIG. 7 illustrates another embodiment of the present invention based on the embodiment shown in FIG. 2A. As shown, a five-digit code (each digit may be a number or a letter) is added to the bottom of the tag and part of the digits overlap with the square units in section 202. Thus, a portion of an image of the code is presented using the bottom row of the tag. Alternatively, a portion of the image may also be presented using the top row of the tag. In addition, the top and bottom rows may be used to present two codes for a tag. The five-digit code provides an additional means for error correction on the tag's code. It also provides a convenient way of identification by human eyes. For example, if the tag's code cannot be completely identified due to, for example, part of the coding area is covered (as illustrated in FIG. 4B), the five-digit code, if can be detected and identified by the detection software, can help to further identifies the tag's code. In one embodiment, the dimension of a digit number/letter is roughly 1×1⅓ of a square unit so the recognition range for the digit number/letter is comparable to ½ of the marker in the best case. The five-digit code may be recognized by deep leaning algorithms, which provide robust error corrections when the recognition confidence level of traditional computer vision based marker recognition is low. Of course, the code could be four or other number of digits as well depending on the application. For instance, the code may contain one or more elements. The elements may include a numerical number, a letter, a character, or a symbol.

Figure 8A:
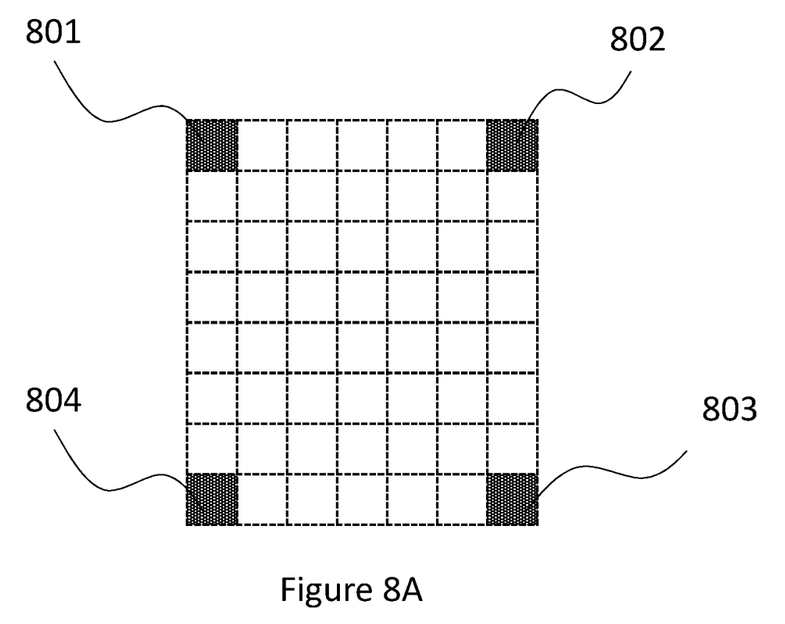
FIG. 8A illustrates a tag design, according to one embodiment of the present invention.
Figure 8B:
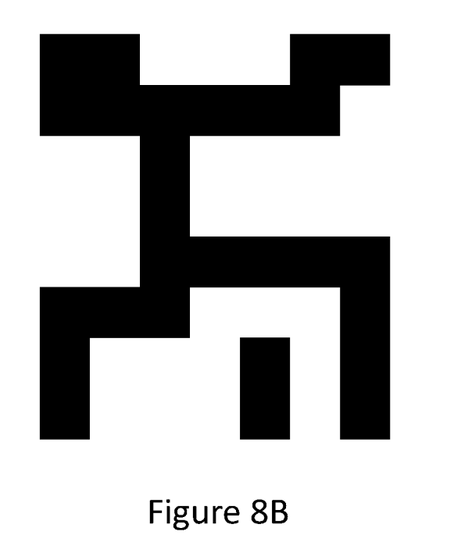
FIG. 8B illustrates an example of a tag, according to one embodiment of the present invention.

FIG. 8A illustrates another tag design, according to yet another embodiment of the present invention. According to this tag design, the four corner square units 801, 802, 803, and 804 are always in black color. In addition, this design requires that the four corner square units 801-804 be interconnected by other black square units in the tag. For example, FIG. 8B illustrates a valid tag under the design illustrated by FIG. 8A. This design further increases the coding space of the tag. In addition, this tag design improves the robustness for detection because it does not depend on whether a specific detection area can be identified from an image. As such, it can deal with warped or uneven surface better than the above disclosed embodiments.

Similar to the embodiment shown in FIG. 6A, a thin border region in white or light color may be placed around the tag shown in FIGS. 8A and 8B. The thin border region creates a sharp contrast with the corners of the tag and makes it easier for detection.

Figure 9:
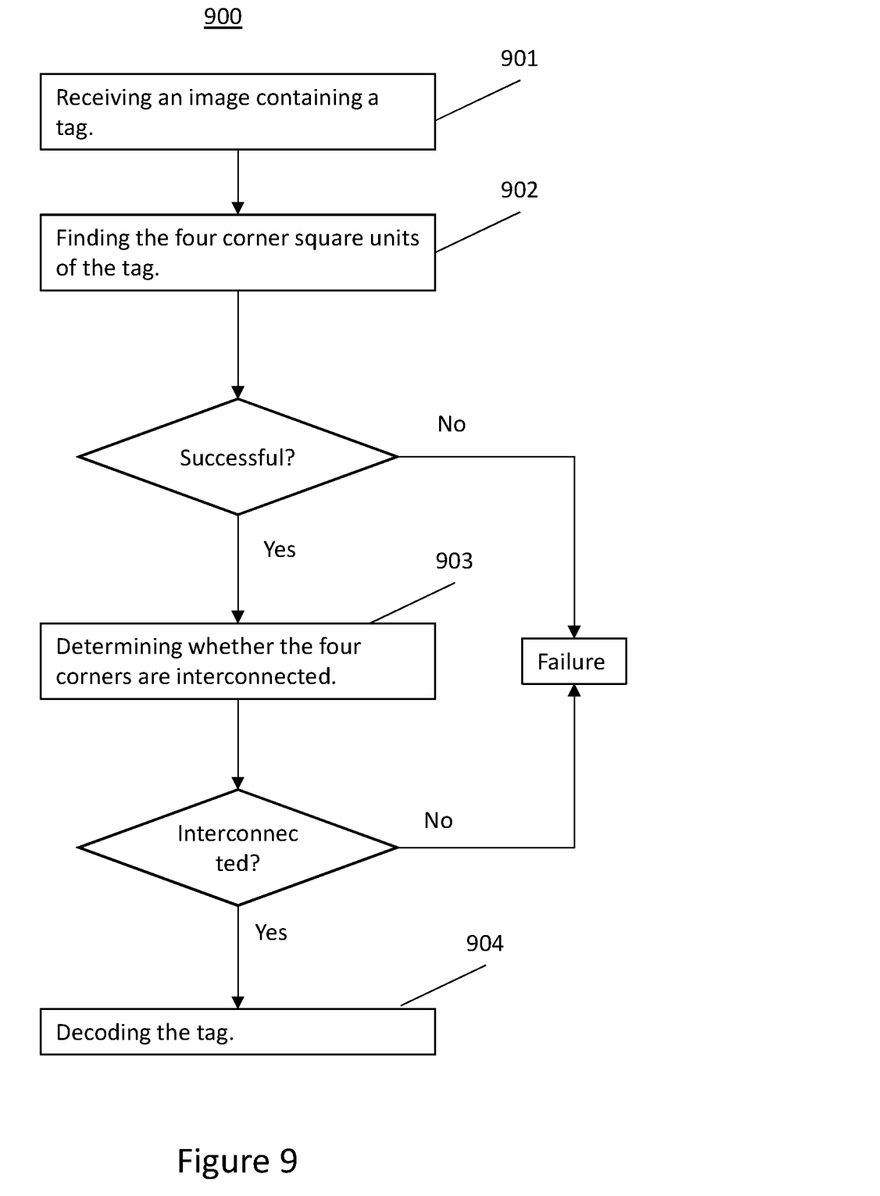
FIG. 9 illustrates a process of detecting a tag, according to one embodiment of the present invention.

FIG. 9 illustrates a process 900 of detecting a tag, such as one following the design illustrated in FIG. 8A. At step 901, the process 900 receives an image of a tag captured by a working camera. As shown in FIGS. 1C and 1D, the tag could be warped or occluded.

At step 902, the process 900 scans the image to find the four corners of the tag, which should be in black color. Various computer vision algorithms may be used for finding the four corners. For example, the process 900 may use Harris corner detector to detect the four corners of the tag. If the four corners are detected, then the process goes to step 903. Otherwise, tag detection fails and the process reports failure.

At step 903, the process 300 scans the image to determine whether the four corners are interconnected in black color. One way to determine whether the four corners are interconnected is to determine whether there is at least one path of connected square units from one tag corner to the other three tag corners. If the detection area is not interconnected, then the process reports failure. Otherwise, the tag is detected, and the process goes to step 904, where the tag is decoded.

In embodiments discussed above, grid dimensions, and orientations (e.g., 8×7 grid) of the invention have been disclosed. Those having ordinary skill in the art will understand that changes can be made to the specific embodiments, grid dimensions, and orientations without departing from the spirit and scope of the invention.

Thus, although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

The invention claimed is:

1. A method for detecting and decoding a square-shaped or rectangular-shaped two-dimensional barcode captured in an image by a camera, the two-dimensional barcode being divided into a plurality of cells based on a grid pattern, each cell in a first full row of cells along a first edge of the two-dimensional barcode being dark color, the first full row of cells including a first corner cell and a second corner cell of the two-dimensional barcode, the first full row of cells defining a first area of the two-dimensional barcode, each cell in a second full row of cells along a second edge of the two-dimensional barcode being dark color, the first edge being opposite to the second edge, the second full row of cells including a third corner cell and a fourth corner cell of the two-dimensional barcode, the second full row of cells defining a second area of the two-dimensional barcode, the first area and the second area being interconnected by a path of connected cells in dark color, each cell in the path of connected cells located not along any edge of the two-dimensional barcode, remaining cells of the plurality of cells being either dark color or light color, the method comprising:

detecting the first, second, third, and fourth corner cells in the image using a processing unit;

determining whether the first and second corner cells are interconnected in the first area in the image using the processing unit;

determining whether the third and fourth corner cells are interconnected in the second area in the image using the processing unit;

after it is determined that the first and second corner cells are interconnected in the first area and that the third and fourth corner cells are interconnected in the second area, determining whether the first area and the second area are interconnected by the path of connected cells in the image, each cell in the path of connected cells located not along any edge of the two-dimensional barcode; and after it is determined that the first area and the second area are interconnected by the path of connected cells, decoding the two-dimensional barcode based on colors of the remaining cells of the plurality of cells.

2. The method of claim 1, wherein the path of connected cells forms a straight line.

3. The method of claim 1, wherein said decoding is also based on colors of the cells in the path of connected cells.

4. The method of claim 1, wherein the two-dimensional barcode is surrounded by a border region in light color.

5. The method of claim 1, wherein a portion of an image of a code is presented using the first or second area, the code including at least one of a plurality of elements, the plurality of elements including a numerical number and a letter.

6. A method comprising:

attaching a two-dimensional barcode to a target object, wherein the two-dimensional barcode is square-shaped or rectangular-shaped, the two-dimensional barcode being divided into a plurality of cells based on a grid pattern, each cell in a first full row of border cells being dark color, the first full row of border cells including a first corner cell and a second corner cell of the two-dimensional barcode, the first full row of border cells defining a first area of the two-dimensional barcode, each cell in a second full row of border cells being dark color, the second full row of border cells including a third corner cell and a fourth corner cell of the two-dimensional barcode, the second full row of border cells defining a second area of the two-dimensional barcode, the first area and the second area being interconnected by a path of connected interior cells in dark color, remaining cells of the plurality of cells being either dark color or light color;

using a camera to capture an image comprising the two-dimensional barcode;

detecting the first, second, third, and fourth corner cells in the image using a processing unit;

determining whether the first and second corner cells are interconnected in the first area in the image using the processing unit;

determining whether the third and fourth corner cells are interconnected in the second area in the image using the processing unit;

after it is determined that the first and second corner cells are interconnected in the first area and the third and fourth corner cells are interconnected in the second area, determining whether the first area and the second area are interconnected by the path of connected interior cells in the image; and after it is determined that the first area and the second area are interconnected by the path of connected interior cells, decoding the two-dimensional barcode based on colors of the remaining cells of the plurality of cells.

7. The method of claim 6, wherein the path of connected interior cells forms a straight line.

8. The method of claim 6, wherein said decoding is also based on colors of the cells in the path of connected interior cells.

9. The method of claim 6, wherein the two-dimensional barcode is surrounded by a border region in light color.

10. The method of claim 6, wherein a portion of a code's image is presented using the first or second area, the code including at least one of a plurality of elements, the plurality of elements including a numerical number and a letter.

11. A system for using a fiducial marker, comprising:

a square-shaped or rectangular-shaped two-dimensional barcode, the two-dimensional barcode being divided into a plurality of cells based on a grid pattern, each cell in a first full row of cells along a first edge of the two-dimensional barcode being dark color, the first full row of cells including a first corner cell and a second corner cell of the two-dimensional barcode, the first full row of cells defining a first area of the two-dimensional barcode, each cell in a second full row of cells along a second edge of the two-dimensional barcode being dark color, the first edge being opposite to the second edge, the second full row of cells including a third corner cell and a fourth corner cell of the two-dimensional barcode, the second full row of cells defining a second area of the two-dimensional barcode, the first area and the second area being interconnected by a path of connected cells in dark color, each cell in the path of connected cells located not on any edge of the two-dimensional barcode, remaining cells of the plurality of cells being either dark color or light color;

a camera for capturing an image comprising the two-dimensional barcode; and a processing unit that executes instructions to perform steps comprising: detecting the first, second, third, and fourth corner cells in the image, determining whether the first and second corner cells are interconnected in the first area in the image, determining whether the third and fourth corner cells are interconnected in the second area in the image, determining whether the first area and the second area are interconnected by the path of connected cells in the image after it is determined that the first and second corner cells are interconnected in the first area, that the third and fourth corner cells are interconnected in the second area, and without determining whether any two of the four corner cells are interconnected in any third area defined by a full column of cells along a third edge of the two dimensional barcode, and decoding the two-dimensional barcode based on colors of the remaining cells of the plurality of cells after it is determined that the first area and the second area are interconnected by the path of connected cells, each cell in the path of connected cells located not on any edge of the two-dimensional barcode.

12. The system of claim 11, wherein the path of connected cells forms a straight line.

13. The system of claim 11, wherein the path of connected cells contains coded information.

14. The system of claim 11, wherein the two-dimensional barcode is surrounded by a border region in light color.

15. The system of claim 11, wherein a portion of a code's image is presented using the first or second area, the code including at least one of a plurality of elements, the plurality of elements including a numerical number and a letter.

* * * * *